United States Patent [19]
Chen

[11] Patent Number: 6,135,401
[45] Date of Patent: Oct. 24, 2000

[54] TOOL FOR SUPPORTING OBJECTS

[76] Inventor: Shi-Jia Chen, 201 Allen St. #2C, New York, N.Y. 10002

[21] Appl. No.: 09/220,028

[22] Filed: Dec. 23, 1998

[51] Int. Cl.[7] ............................. F16M 11/24; F16M 11/26
[52] U.S. Cl. ..................................... 248/188.5; 248/188.4
[58] Field of Search ............................ 248/188.4, 188.2, 248/650, 354.3, 188.5, 157, 200.1

[56] References Cited

U.S. PATENT DOCUMENTS

| | | | |
|---|---|---|---|
| 287,913 | 11/1883 | Dawson et al. | 248/188.4 |
| 972,287 | 10/1910 | Swift | 248/188.4 |
| 2,010,299 | 8/1935 | Gray | 248/188.4 |
| 2,941,766 | 6/1960 | Van Ranst | 248/141.7 |
| 4,413,538 | 11/1983 | Norman | 81/57.13 |
| 4,562,629 | 1/1986 | Cerio | 29/156.7 R |
| 4,706,359 | 11/1987 | Greenhill | 29/271 |
| 4,789,121 | 12/1988 | Gidseg et al. | 288/188.2 |
| 5,116,004 | 5/1992 | Luecke | 248/157 |
| 5,505,562 | 4/1996 | Stankus | 405/259.1 |
| 5,673,585 | 10/1997 | Bishop | 72/447 |
| 5,881,979 | 3/1999 | Rozier, Jr. et al. | 248/188.5 |
| 5,890,696 | 4/1999 | Ozawa | 248/677 |

*Primary Examiner*—Ramon O. Ramirez
*Assistant Examiner*—Jon Szumny
*Attorney, Agent, or Firm*—Goldstein & Canino

[57] ABSTRACT

A tool for supporting objects including a sleeve having an upper end with an opening therein. The lower end has an opening therein. An upper member is threadably received within the opening of the upper end of the sleeve. The upper member has an externally threaded lower portion. An upper end of the lower portion has a circular disk secured thereto. An upper surface of the circular disk has a layer of protective rubber disposed thereon. A lower member is threadably received within the opening of the lower end of the sleeve. The lower member has an externally threaded upper portion. A lower end of the upper portion of the lower member has a circular disk secured thereto. A lower surface of the circular disk has a layer of protective rubber disposed thereon.

1 Claim, 2 Drawing Sheets

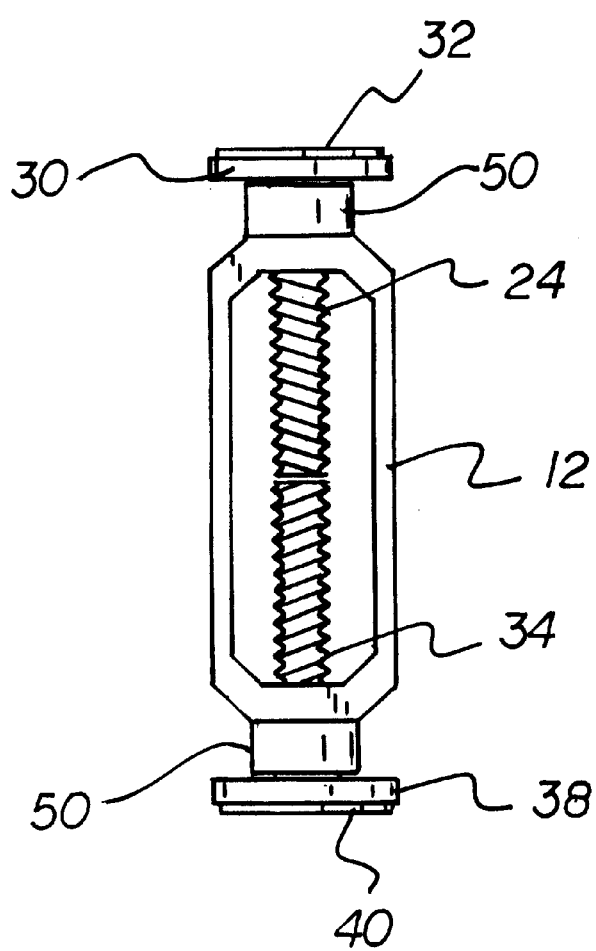
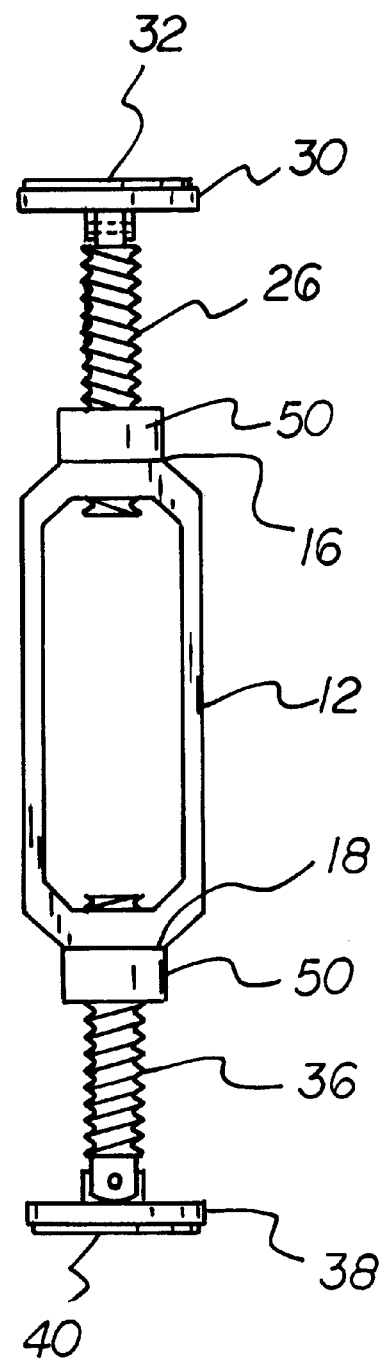

TOOL FOR SUPPORTING OBJECTS

BACKGROUND OF THE INVENTION

The present invention relates to a tool for supporting objects and more particularly pertains to supporting objects in a confined space for repair or the like.

The need to support objects or push an object against a solid structure until the object is glued against the object is a prevalent one. The present invention provides a means of accomplishing such a task. Also, once furniture legs become detached they usually cannot be reattached. The present invention can be used as a replacement for the detached legs. Primarily, the present invention can be used when space is extremely limited and there is a need for an object to be supported. The present invention attempts to satisfy this requirement.

The use of support tools is known in the prior art. More specifically, support tools heretofore devised and utilized for the purpose of supporting objects are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,562,629 to Carlo discloses a tool capable of exerting an outwardly directed force on the end of a valve for use on an internal combustion engine. U.S. Pat. No. 5,673,583 to Bishop discloses a punching tool device for producing cuts, impressions and dimples in a sheet metal blank. U.S. Pat. No. 5,505,562 to Stankus discloses a wrench for use with a mine roof bolting apparatus. U.S. Pat. No. 4,413,538 to Norman discloses a universal tool capable of being releasably attached to the workpiece to prevent relative movement between the tool and the workpiece.

While these devices fulfill their respective, particular objective and requirements, the aforementioned patents do not describe a tool for supporting objects for supporting objects in a confined space for repair or the like.

In this respect, the tool for supporting objects according to the present invention substantially departs from the conventional concepts and designs of the prior art, and in doing so provides an apparatus primarily developed for the purpose of supporting objects in a confined space for repair or the like support tools.

Therefore, it can be appreciated that there exists a continuing need for new and improved tool for supporting objects which can be used for supporting objects in a confined space for repair or the like support tools. In this regard, the present invention substantially fulfills this need.

SUMMARY OF THE INVENTION

In the view of the foregoing disadvantages inherent in the known types of supporting objects now present in the prior art, the present invention provides an improved tool for supporting objects. As such, the general purpose of the present invention, which will be described subsequently in greater detail, is to provide a new and improved tool for supporting objects and method which has all the advantages of the prior art and none of the disadvantages.

To attain this, the present invention essentially comprises a sleeve having a generally hexagonal configuration. The sleeve has an internally threaded bore extending therethrough from the upper end to the lower end. The upper end has an opening therein consistent with a diameter of the bore. The lower end has a threaded opening therein of a reduced diameter with respect to the bore. An upper member is threadably received within the opening of the upper end of the sleeve. The upper member has an externally threaded lower portion. The lower portion has an open lower end. An upper end of the lower portion has a circular disk secured thereto. An upper surface of the circular disk has a layer of protective rubber disposed thereon. A lower member is threadably received within the threaded opening of the lower end of the sleeve. The lower member has an externally threaded upper portion. The upper portion is dimensioned for being received within the open lower end of the lower portion of the upper member in a retracted orientation. A lower end of the upper portion of the lower member has a circular disk secured thereto. A lower surface of the circular disk has a layer of protective rubber disposed thereon. A tool is provided that is adapted for engaging the sleeve whereby rotation of the sleeve will cause the upper member and the lower member to extend outwardly with respect to the sleeve.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tool for supporting objects which has all the advantages of the prior art supporting tools and none of the disadvantages.

It is another object of the present invention to provide a new and improved tool for supporting objects which may be easily and efficiently manufactured and marketed.

It is a further object of the present invention to provide a new and improved tool for supporting objects which is of durable and reliable construction.

An even further object of the present invention is to provide a new and improved tool for supporting objects which is susceptible of a low cost of manufacture with regard to both materials and labor, and which accordingly is then susceptible of low prices of sale to the consuming public, thereby making such a tool for supporting objects economically available to the buying public.

Even still another object of the present invention is to provide a new and improved tool for supporting objects for supporting objects in a confined space for repair or the like.

Lastly, it is an object of the present invention to provide a new and improved tool for supporting objects including a sleeve having an upper end with an opening therein. The lower end has an opening therein. An upper member is threadably received within the opening of the upper end of the sleeve. The upper member has an externally threaded lower portion. An upper end of the lower portion has a circular disk secured thereto. An upper surface of the circular disk has a layer of protective rubber disposed thereon. A lower member is threadably received within the opening of the lower end of the sleeve. The lower member has an externally threaded upper portion. A lower end of the upper portion of the lower member has a circular disk secured thereto. A lower surface of the circular disk has a layer of protective rubber disposed thereon.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a side view of an alternate embodiment of the present invention illustrated in a retracted orientation.

FIG. 4 is a side view of the alternate embodiment of the present invention illustrated in an extended orientation.

The same reference numerals refer to the same parts through the various figures.

DESCRIPTION OF THE PREFERRED EMBODIMENT

Figure 1:
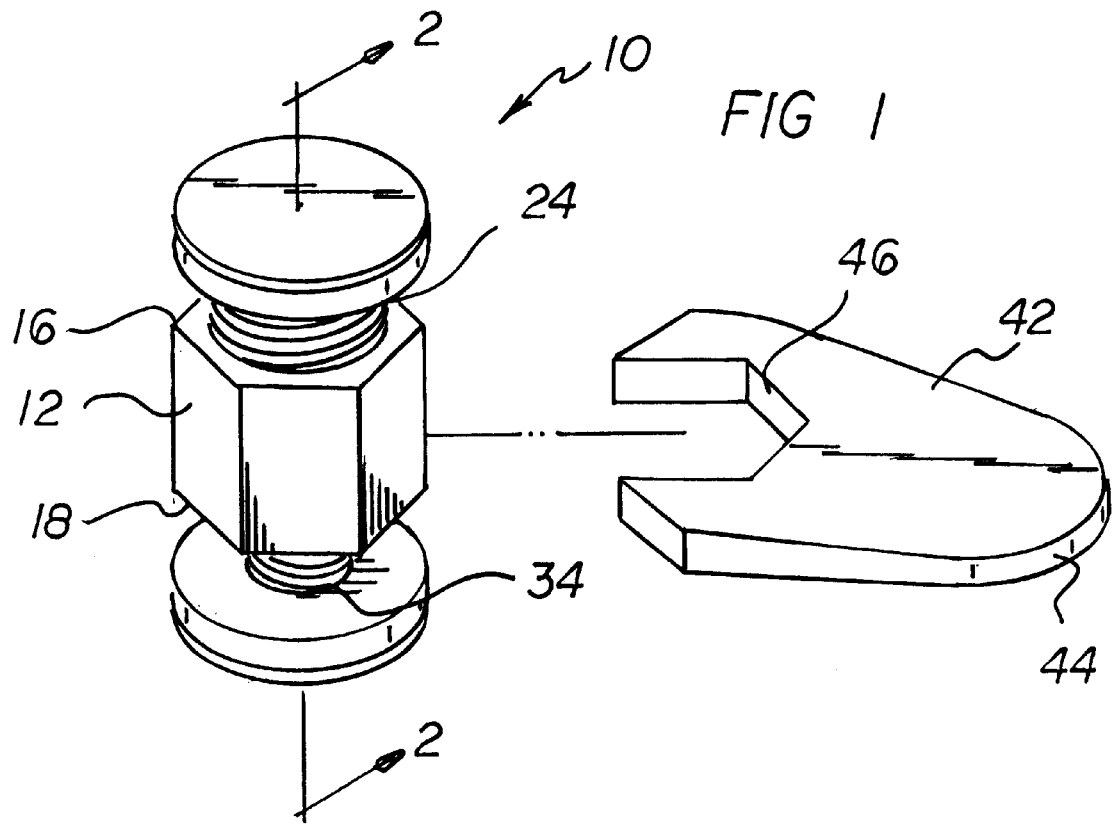
FIG. 1 is a perspective view of the preferred embodiment of the tool for supporting objects constructed in accordance with the principles of the present invention.
Figure 2:
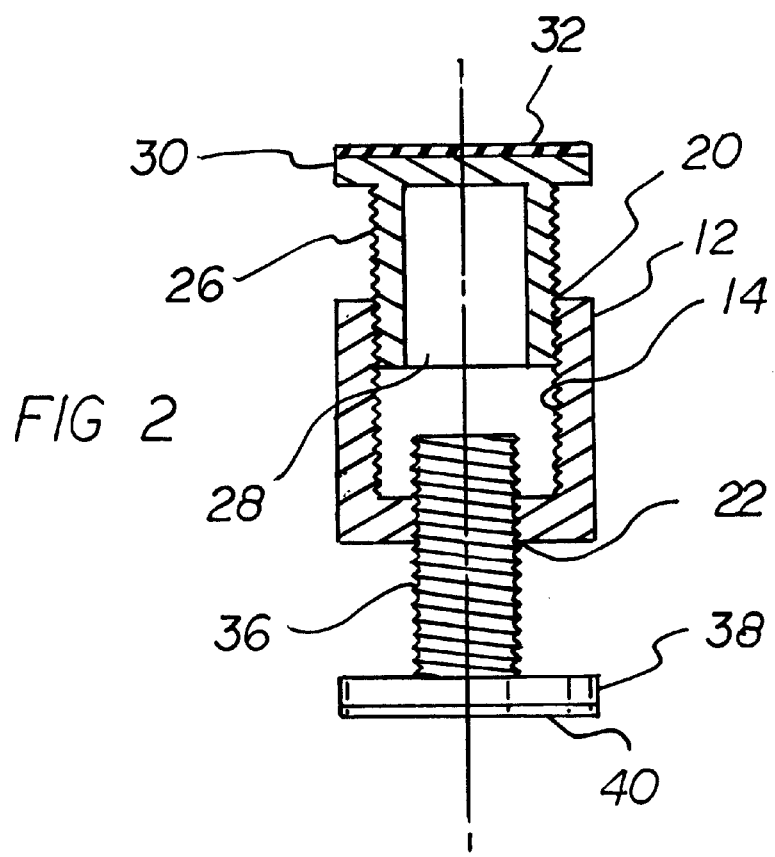
FIG. 2 is a cross-sectional view of the present invention as taken along line 2—2 of FIG. 1.

With reference now to the drawings, and in particular, to FIGS. 1 through 4 thereof, the preferred embodiment of the new and improved tool for supporting objects embodying the principles and concepts of the present invention and generally designated by the reference number 10 will be described.

Specifically, it will be noted in the various Figures that the device relates to a tool for supporting objects for supporting objects in a confined space for repair or the like. In its broadest context, the device consists of a sleeve, an upper member, a lower member, and a tool. Such components are individually configured and correlated with respect to each other so as to attain the desired objective.

The sleeve 12 has a generally hexagonal configuration. The sleeve 12 has an internally threaded bore 14 extending therethrough from the upper end 16 to the lower end 18. The upper end 16 has an opening 20 therein consistent with a diameter of the bore 14. The lower end 18 has a threaded opening 22 therein of a reduced diameter with respect to the bore 14.

The upper member 24 is threadably received within the opening 20 of the upper end 16 of the sleeve 12. The upper member 24 has an externally threaded lower portion 26. The lower portion 26 has an open lower end 28. An upper end of the lower portion 26 has a circular disk 30 secured thereto. An upper surface of the circular disk 30 has a layer of protective rubber 32 disposed thereon.

The lower member 34 is threadably received within the threaded opening 22 of the lower end 18 of the sleeve 12. The lower member 34 has an externally threaded upper portion 36. The upper portion 36 is dimensioned for being received within the open lower end 28 of the lower portion 26 of the upper member 24 in a retracted orientation. A lower end of the upper portion 36 of the lower member 34 has a circular disk 38 secured thereto. A lower surface of the circular disk 38 has a layer of protective rubber 40 disposed thereon.

The tool 42 is adapted for engaging the sleeve 12 whereby rotation of the sleeve 12 will cause the upper member 24 and the lower member 34 to extend outwardly with respect to the sleeve 12. The tool 42 includes an essentially rigid handle 44 and a four-sided opening 46 that will receive the sleeve 12 therein for manipulation. The tool 42 would be altered to meet the configuration of the sleeve 12. Thus, by placing the device 10 between two flat objects and then using the tool 42 to rotate the sleeve 12 will cause the upper and lower members 24,34 to push the two objects further apart.

A second embodiment of the present invention is shown in FIGS. 3 and 4 and includes substantially all of the components of the present invention wherein the internally thread bore 14 of the sleeve 12 is replaced by a pair of internally threaded collars 50 secured with respect to the upper and lower ends 16,18 of the sleeve 12. The sleeve 12 is also much longer and essentially hollow. This allows for the upper and lower members 24,34 to be retracted entirely within the sleeve 12 whereby the ends of the members nearly abut. The circular disks 30,38 are also pivotally coupled with respect to the upper and lower members 24,34. This is generally created by having bifurcations formed on the ends of the threaded members 26,36 and the circular disks having a tab extending downwardly therefrom for being positioned within the bifurcations and coupled by a pin. Note FIG. 4. The alternate embodiment would be utilized in places where there is more space since it is essentially larger than the preferred embodiment.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the united states is as follows:

1. A tool for supporting objects in a confined space for repair comprising, in combination:

a sleeve having an upper end having an opening therein and a lower end having an opening;

said upper and lower ends of the sleeve each having an internally threaded sleeve in communication with the respective openings of the upper and lower ends for receiving the upper and lower member;

an upper member threadably received within the opening of the upper end of the sleeve, the upper member having an externally threaded lower portion, an upper end of the lower portion having a circular disk pivotally coupled with respect to the upper member, an upper surface of the circular disk having a layer of protective rubber disposed thereon;

a lower member threadably received within the opening of the lower end of the sleeve, the lower member having an externally threaded upper portion, a lower end of the upper portion of the lower member having a circular disk pivotally coupled with respect to the lower member, a lower surface of the circular disk having a layer of protective rubber disposed thereon.

* * * * *